US012715191B2

(12) United States Patent
Gülink et al.

(10) Patent No.: US 12,715,191 B2
(45) Date of Patent: Aug. 25, 2026

(54) PRODUCTION SYSTEM, METHOD AND COMPUTER PROGRAM PRODUCT

(71) Applicant: Siemens Gamesa Renewable Energy A/S, Brande (DK)

(72) Inventors: Hendrik Gülink, Hamburg (DE); Kenneth Lee Kaser, Huntington Beach, CA (US); Daniel Luecht, Hamburg (DE); Fionnan Theodore Mainstone, Hamburg (DE); Jason Stege, Vejle (DK); Bjarne Haahr Svendsen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/274,684

(22) PCT Filed: Feb. 3, 2022

(86) PCT No.: PCT/EP2022/052596
§ 371 (c)(1),
(2) Date: Jul. 27, 2023

(87) PCT Pub. No.: WO2022/167531
PCT Pub. Date: Aug. 11, 2022

(65) Prior Publication Data

US 2024/0109264 A1 Apr. 4, 2024

(30) Foreign Application Priority Data

Feb. 4, 2021 (EP) .................................... 21382093

(51) Int. Cl.
*B29C 70/30* (2006.01)
*B29C 70/54* (2006.01)
(Continued)

(52) U.S. Cl.
CPC .......... *B29D 99/0025* (2013.01); *B29C 70/30* (2013.01); *B29C 70/54* (2013.01); *G01B 11/16* (2013.01)

(58) Field of Classification Search
CPC ..... B29C 70/386; B29C 70/388; B29C 70/38; B29C 70/30
See application file for complete search history.

(56) References Cited

U.S. PATENT DOCUMENTS 6,064,429 A 5/2000 Belk et al.
12,109,764 B2 * 10/2024 Duval .................... B29C 70/88
(Continued)

FOREIGN PATENT DOCUMENTS

CN 111405975 A 7/2020
EP 0470901 A1 2/1992
(Continued)

OTHER PUBLICATIONS

PCT International Search Report and Written Opinion of International Searching Authority mailed May 27, 2022 corresponding to PCT International Application No. PCT/EP2022/052596 filed Mar. 2, 2022.

(Continued)

*Primary Examiner* — Matthew J Daniels
(74) *Attorney, Agent, or Firm* — Schmeiser Olsen PLLC

(57) ABSTRACT

A production system for producing a composite fiber component, in particular a wind turbine blade, includes: a working surface; an optical device for optically capturing features of the working surface and/or of plies laid on the working surface, the plies including fiber material; a computing device for determining a parameter of the captured features and a comparative result depending on a comparison of the determined parameter and a reference parameter; and a feedback device configured to give feedback depend-
(Continued)

ing on the comparative result. In this way, the ply lay-up process is monitored and deviations is detected easily and as they occur.

14 Claims, 2 Drawing Sheets

(51) Int. Cl.
*B29D 99/00* (2010.01)
*G01B 11/16* (2006.01)

(56) References Cited

U.S. PATENT DOCUMENTS

| | | | | |
|---|---|---|---|---|
| 2004/0021828 | A1 | 2/2004 | Evans et al. | |
| 2011/0089591 | A1* | 4/2011 | Gordon | B29C 70/541 425/169 |
| 2019/0202143 | A1* | 7/2019 | Salimi | B29C 70/38 |
| 2019/0315076 | A1* | 10/2019 | Duval | B64F 5/10 |

FOREIGN PATENT DOCUMENTS

| | | | | |
|---|---|---|---|---|
| EP | 1503206 | A1 * | 2/2005 | B29C 70/54 |
| WO | 2019006353 | A1 | 1/2019 | |

OTHER PUBLICATIONS

Anonymous: "Advanced rotor blade 1-15 manufacturing using LAP's laser projection system Composite Pro"; Windfair all in wind; Sep. 15, 2016 (Sep. 15, 2016); XP055556775.

* cited by examiner

PRODUCTION SYSTEM, METHOD AND COMPUTER PROGRAM PRODUCT

CROSS-REFERENCE TO RELATED APPLICATIONS

This application claims priority to PCT Application No. PCT/EP2022/052596, having a filing date of Feb. 3, 2022, which claims priority to EP Application No. 21382093.9, having a filing date of Feb. 4, 2021, the entire contents both of which are hereby incorporated by reference.

FIELD OF TECHNOLOGY

The following relates to a production system, a method and a computer program product.

BACKGROUND

Producing more power using a wind turbine under given wind conditions can be achieved by increasing the size of the blades. However, the manufacture of wind turbine blades is becoming increasingly difficult for increasing blade sizes.

Wind turbine blades are manufactured from plies of fiber material which are infused with a resin and cured in a mold. With blades becoming larger and larger, the ply lay-up process is crucial with regard to process cost and time.

SUMMARY

An aspect relates to provide a production system, method and computer program product (non-transitory computer readable storage medium having instructions, which when executed by a processor, perform actions) providing an improved approach towards producing a composite fiber component.

Accordingly, there is provided a production system for producing a composite fiber component, in particular a wind turbine blade, comprising:

- a working surface;
- an optical device for optically capturing features of the working surface and/or of plies laid on the working surface, said plies comprising fiber material;
- a computing device for determining a parameter of the captured features and a comparative result depending on a comparison of the determined parameter and a reference parameter; and
- a feedback device configured to give feedback depending on the comparative result.

In this way, the ply lay-up process can be monitored and deviations can be detected easily and as they occur. The feedback is given to a worker who can then react accordingly, e.g. he or she can adjust a position of a ply. In embodiments, the feedback may also be given to a robot, the robot being controlled to perform the lay-up of plies. "Robot" herein includes any fully or partially automated device or machine.

The reference parameter may be an expected or target value. For example, the reference parameter is read from a storage device of the system. The reference parameter may be determined empirically, through modelling (i.e. simulation) or otherwise prior to operation of the system. The reference parameter, the comparative value and/or the given feedback or guidance may be improved through machine learning (using e.g. neural networks and/or deep learning) during the operation of the system.

"Plies laid on the working surface" herein is to be understood as plies lying directly on the working surface or indirectly with other plies, balsa wood or other materials placed in-between.

The feedback is given in real-time. This is to say that the feedback is given substantially at the same time when the captured features change. For example, the feedback is given within less than 5 seconds, 3 seconds or 1 second from the change.

The features are captured continuously as a respective ply is placed on the working surface.

"Working surface" is any surface configured to support the plies. The working surface may be a surface of a mold, mold portion, mandrel or any other tool, jig or fixture used in producing a composite fiber component. On the other hand, the working surface may also be formed by a part or component (in particular a precast or cured composite fiber component). For example, in this way repairs can be done on a composite fiber component that has already been produced and used in the field.

The plies comprise fiber material, e.g., carbon and/or glass fibers. The plies may be infused with a resin after the lay-up has been completed, or the plies may already comprise the resin at the point in time when they are laid on the working surface (e.g., prepreg material or pultruded, extruded or precast segments).

The computing device may comprise one or more microprocessors, memory (e.g., RAM, ROM), a hard disc (e.g. SSD) etc. In determining the parameter (in particular a position) of the captured features and comparing said parameter to a reference parameter (in particular a reference position), the color and/or location of captured pixels may be used. In particular, the computing device may generate a height-profile and/or 3D-profile of the volume of space above and/or including the working surface. In the case of lidar, for example, distances between the sensor and a respective object may be measured. The computing device may combine these distances to generate the height-profile and/or 3D-profile of the volume of space above and/or including the mold surface.

According to an embodiment, the optical device comprises a plurality of optical cameras and/or lidar sensors.

These types of sensors are well suited towards capturing optical features of the working surface or plies.

According to a further embodiment, the system includes a mold and the working surface is a mold surface, and/or the optical device captures features within a volume above and/or including the entire, mold surface.

E.g., the mold surface may be comprised by a mold half. The mold may be configured to cure the plies using heat and/or pressure.

The entire mold surface is monitored. In particular, the entire mold is monitored through the entire lay-up-process (i.e., from the first to the last ply being placed).

According to a further embodiment, the captured features comprise edges, material and/or defects of the plies, reference points on the working surface and/or foreign objects and/or the parameter includes a position (e.g., 3D-coordinates), geometry, color and/or texture.

Edges are particularly useful in determining the correct location of a respective ply. Further, the material (fibers, steel, wood) may be identified using, e.g., color. A "foreign object" is an object that is not to be combined with other parts to form the composite components to be produced. The computing device may be configured to determine that an object is a foreign object by (i) evaluating the comparative value (i.e. in particular evaluating the question of what the respective surface should look like without the object; therein, the parameters evaluated in respect of the object may be its position, geometry, color etc.) and/or (ii) evaluating contextual data for example relating to workers in the vicinity of the object. For example, if no worker interacts with an object that cannot be associated with any of the materials (plies, balsa wood etc.) making up the composite component to be produced or with the working surface itself for more than a predefined period of time (e.g., 10 minutes), then the computing device decides that the object is a foreign object. Foreign objects may be tools (e.g., scissors or washers) etc.

According to a further embodiment, the feedback includes a visual and/or acoustic feedback.

This feedback can be easily recognized by a worker operating on the working surface. In one embodiment, the feedback is provided through an augmented reality device (e.g., glasses)

According to a further embodiment, the visual feedback includes a pattern of light projected on the working surface and/or on an upwardly exposed surface of a ply.

Thus, the mold surface and/or a ply that has already been placed is efficiently used as a screen.

According to a further embodiment, the system includes a projector device for projecting a pattern of light on the working surface and/or on an upwardly exposed surface to guide placement of plies on the working surface and/or on the said ply.

For example, the pattern may include markings, symbols, letters, numbers etc. The projector device may be (at least in parts) identical to the feedback device. Besides guiding the worker, the projected pattern may also provide feedback. E.g., the projected pattern may (i) indicate a target position of a ply (as described below) and (ii) blink or change color to include feedback (e.g. blinking in red meaning that the current and target position do not yet correspond).

According to a further embodiment, the projector device including one or more lasers.

Thereby, the pattern can be generated easily.

According to a further embodiment, the pattern demarcates a target position of a ply to be placed on the working surface and/or on the upwardly exposed ply, said pattern demarcating a target position of edges of the ply.

For example, the pattern may include markings (lines, triangles etc.) which indicate where edges of the plies should come to be arranged once the respective ply lies on the working surface (or on another plie).

According to a further embodiment, the system further comprises a control device, the control device being configured for controlling:

- the projector device to project a first pattern corresponding to a target position of a first ply and a second pattern corresponding to a target position of a second ply;
- the optical device to optically capture features of the first ply laid on the working surface; and
- the computing device to determine a position of the captured features of the first ply and a comparative result depending on a comparison of the determined position and a reference position;
- wherein the projection of the second pattern depends on the comparative result.

For example, the system will only proceed to guide the workers towards placing the second ply if the position of the first ply is correct. Otherwise, the markings for the second ply will not show up on the first ply and/or other plies or the working surface.

According to a further embodiment, the system further comprises a control device, the control device being configured for controlling:

- the projector device to project a $k^{th}$ pattern corresponding to a target position of a $k^{th}$ ply; and
- the optical device to capture the features of the entire, working surface and/or $1^{st}$ to $k^{th}$ ply laid on the working surface;
- wherein k is incremented from 1 to N, with N designating the total number of plies making up the composite fiber component to be produced or portion thereof.

Thus, each time a ply is placed, the system checks for any changes that may have occurred in the meantime on plies that have already been placed on the working surface or on other (free) portions of the working surface. This ensures that the lay-up is correct.

According to a further embodiment, the system further comprising a control device, the control device being configured for controlling:

- the projector device to project a $k^{th}$ pattern corresponding to a target position of a $k^{th}$ ply, and, at the same time, to project a $j^{th}$ pattern corresponding to a target position of a $j^{th}$ ply;
- a computing device for determining a position of the captured features and a comparative result depending on a comparison of the determined position and a reference position, for the $k^{th}$ and $j^{th}$ ply respectively; and
- a feedback device configured to give feedback depending on the respective comparative result;
- wherein k is incremented from 1 to N, with N designating the total number of plies making up a first portion of the composite component to be produced, and j is incremented from 1 to M, with M designating the total number of plies making up a second portion of the composite component to be produced.

Therefore, at least two teams can work in parallel. For example, the two teams can start from opposite ends of the component with laying the plies. This makes the lay-up process faster.

According to a further embodiment, the system further comprises a storage device for storing the captured features.

In particular, all features captured during the lay-up process are stored. Thereby, a digital twin is produced which can be used later during fault-analysis, for example, during a service or after failure of the component, e.g., a wind turbine blade.

According to a further embodiment, the computing device uses a machine learning algorithm and/or uses edge computing.

According to a further aspect, there is provided a method for producing a composite fiber component, in particular a wind turbine blade, comprising the steps of:

- optically capturing features of a working surface and/or of plies laid on the working surface, said plies comprising fiber material;
- determining a parameter of the captured features and a comparative result depending on a comparison of the determined parameter and a reference parameter; and
- giving feedback depending on the comparative result.

According to a further embodiment, the method comprises the steps of:

- projecting a first pattern corresponding to a target position of a first ply;
- placing the first ply on the working surface using the first pattern as a guidance;

optically capturing features of the first ply on the working surface;

determining a position of the captured features of the first ply and a comparative result depending on a comparison of the determined position and a reference position; and projecting a second pattern corresponding to a target position of a second ply depending on the comparative result.

For example, the second pattern is only projected if the first ply is found to be in the correct position by way of the comparative result.

According to a further embodiment, the method comprises the steps of:

setting k equal to 1;

while k is smaller or equal to N, with N designating the total number of plies making up the composite fiber component to be produced or portion thereof:

projecting a $k^{th}$ pattern corresponding to a target position of a $k^{th}$ ply;

placing the $k^{th}$ ply on the working surface using the $k^{th}$ pattern as a guidance;

capturing the features of the, entire, working surface and/or $1^{st}$ to $k^{th}$ ply laid on the working surface;

determining a position of the captured features and a comparative result depending on a comparison of the determined position and a reference position; and incrementing k by 1.

Thus, each time a ply is placed, the system checks for any changes that may have occurred in the meantime.

According to a further embodiment, the method comprises the steps of:

setting k and j equal to 1;

while k is smaller or equal to N, with N designating the total number of plies making up a first portion of the composite component to be produced, and j is smaller or equal to M, with M designating the total number of plies making up a second portion of the composite component to be produced:

projecting a $k^{th}$ pattern corresponding to a target position of a $k^{th}$ ply, and, at the same time, projecting a $j^{th}$ pattern corresponding to a target position of a $j^{th}$ ply;

placing a $k^{th}$ ply on the working surface using the $k^{th}$ pattern as a guidance, and placing the $j^{th}$ ply on the working surface using the $j^{th}$ pattern as a guidance;

determining a position of the captured features and a comparative result depending on a comparison of the determined position and a reference position for the $k^{th}$ and $j^{th}$ ply respectively;

giving feedback depending on the respective comparative result; and incrementing k and j by 1, respectively.

Thereby, the lay-up work can be done in parallel.

According to a further aspect, there is provided a computer program product comprising a program code for executing the above-mentioned method when run on at least one computer.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

The respective device, e.g., the optical, computing, control or feedback device, may be implemented—at least partially—in hardware and/or in software. If said device is implemented in hardware, it may be embodied as a computer or as a processor or as a part of a system, e.g., a computer system. If said device is implemented in software it may be embodied as a computer program product, as a function, as a routine, as a program code or as an executable object.

The embodiments and features described with reference to the system of embodiments of the present invention apply mutatis mutandis to the method and/or computer program product of embodiments of the present invention.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
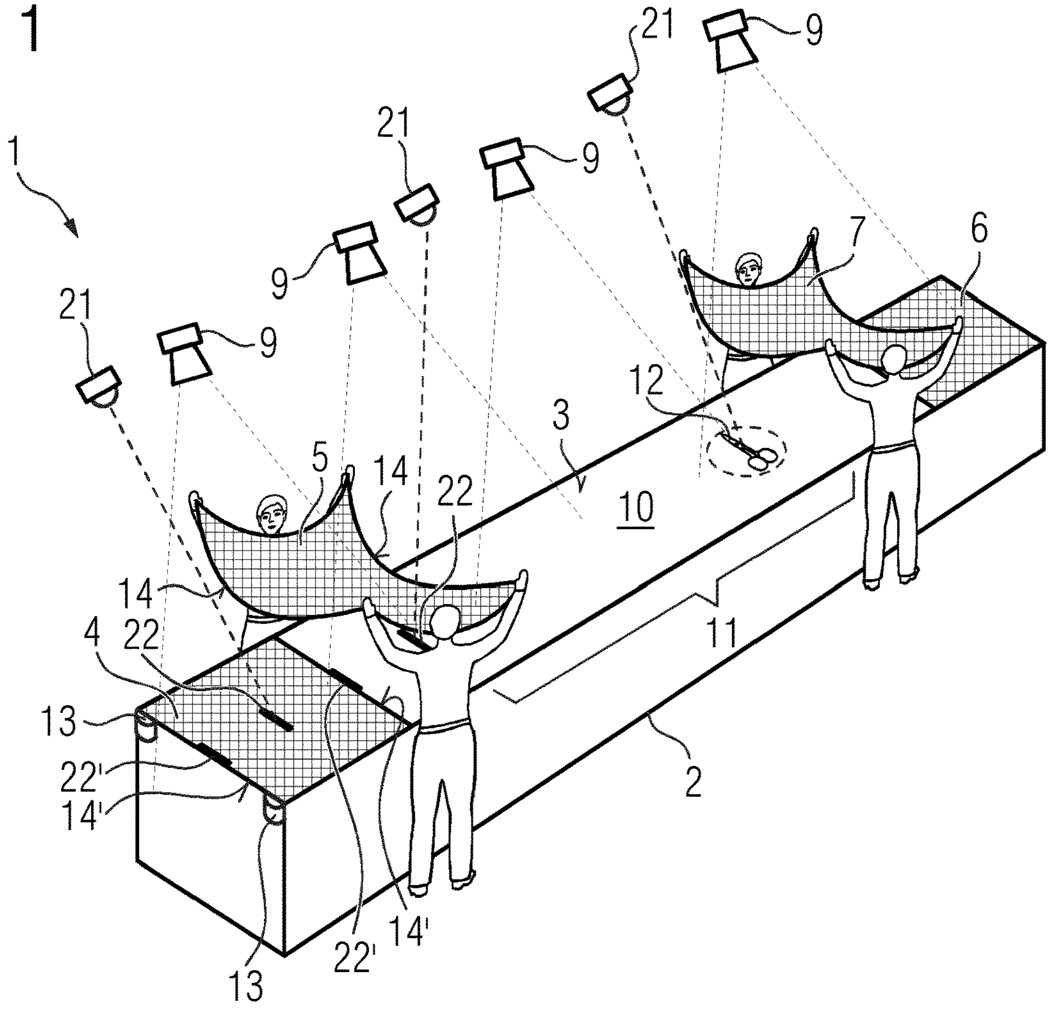
FIG. 1 shows, in a perspective view, of a part of a productions system according to an embodiment.

In the Figures, like reference numerals designate like or functionally equivalent elements, unless otherwise indicated.

FIG. 1 shows a production system 1. The production system 1 includes a mold 2 having a mold surface 3. The mold 2—of which only one mold half is shown in FIG. 1—is configured for manufacturing a composite fiber component, in the case of the example, a wind turbine blade.

To this end, plies 4-7 of fiber material are picked up by workers from a storage or cutting station (not shown) and laid on the mold surface 3 or on a ply that has previously been placed on the mold surface 3. The fiber material may comprise, e.g., carbon fibers or glass fibers. In addition, balsa wood, foam or other materials (not shown) may be placed on the mold surface 3 or on existing plies.

Once all plies 4-7 (and balsa wood etc.) have been placed correctly in the mold 2, the mold 2 is closed and a vacuum is created inside. Next, the plies 4-7 inside the mold 2 are infused with a resin and cured. The cured blade can then be removed from the mold 2.

The plies 4-7 must be placed in the right locations inside the mold 2. These locations are defined by a CAD (Computer Aided Design) model, for example. The CAD model contains 3D-coordinate data defining the layout of the plies and other materials. The CAD model is e.g. generated during the design phase of the blade. Therein, the plies and other materials have been arranged to obtain the desired blade properties, e.g., strength or weight.

The production system 1 is designed to guide the workers (or robots in other embodiments) when placing the plies 4-7 and also to give feedback to them. To this end, the production system 1 comprises an optical device 8 (FIG. 3) having multiple cameras 9 (FIG. 1). The cameras 9 capture, using CCD (charge coupled device) chips or the like, the volume 10 above and including the mold surface 3. Instead or in addition to the cameras 9, the optical device 8 may include lidar sensors (not shown).

The cameras 9 cover the entire mold 2 or volume 10. In the case of FIG. 1, the cameras 9 will record the plies 4-7, the free mold portion 11 as well as a pair of scissors 12 lying on the mold surface 2. In particular, the cameras 9 capture features such as reference points 13 of the mold 2 as well as edges 14 of respective plies 4-7.

Figure 3:
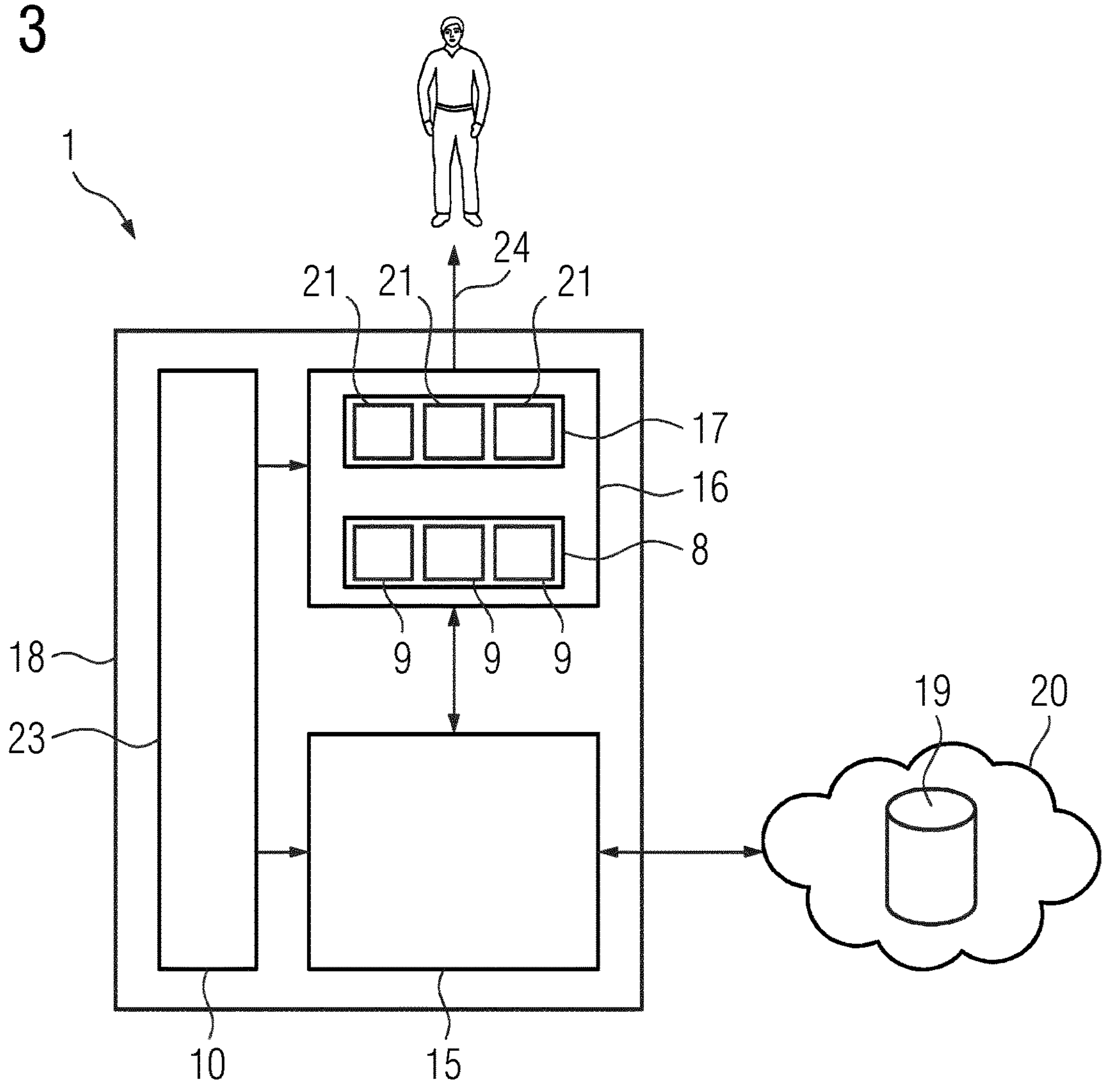
FIG. 3 shows in a schematic drawing further components of the production system of FIG. 1.

Further, the production system 1 comprises a computing device 15 shown in FIG. 3. The computing device 15, for example a server including a plurality of GPUs (graphics processing units), is in data communication with IoT devices 16. The IoT devices 16 include the optical device 8 as well as a combined feedback and projector device 17.

Both, the computing device 15 and the IoT devices 16, are located on the factory site 18 for minimal latency which will be explained in more detail. The computing device 15 is further in data communication with a data storage device 19 in the cloud 20.

The computing device 15 uses machine learning, i.e., algorithms that improve automatically through experience (for example using deep learning and/or neural networks developed by labelling data sets), to analyze the data recorded by the cameras 9 in FIG. 1. Therein, the features (in particular, the scissors 12, the reference points 13 and edges 14) are extracted (the extraction process may be error checked using chi squared statistical analysis) and associated with 3D-coordinates (also termed "determined parameter" herein). These actual coordinates are compared to target coordinates (also termed "reference parameter" herein) from the CAD model. The computing device 15 then yields a comparative result.

The productions system 1 of FIG. 3 further comprises an on-site control device 23 which, depending on the comparative result, gives instructions to the feedback and projector device 17.

Figure 2:
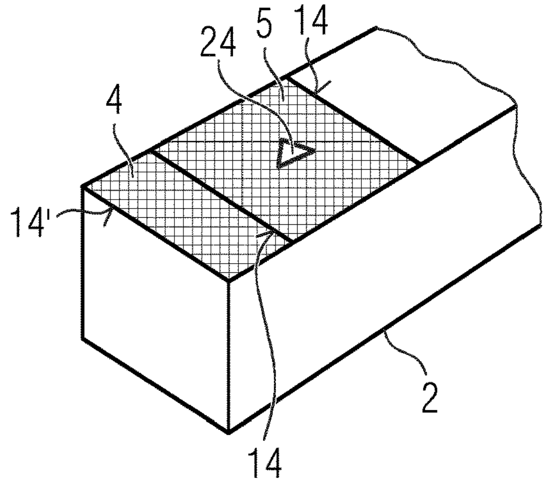
FIG. 2 shows, in a perspective view, a detail view from FIG. 1.

The feedback and projector device 17 comprises a number of lasers 21 as shown in FIG. 1. The lasers 21, controlled by the control device 23 (see FIG. 3), projects visible markings 22 onto the ply 4 which has already been placed and onto the mold surface 2 indicating where the edges 14 of the ply 5 (also termed "$k^{th}$ plie" herein) should be arranged when the ply 5 is laid into the mold 2. Once the ply 5 has been correctly placed (which is decided based on the comparative result mentioned above, i.e. when the actual and target coordinates agree), the control device 23 will control the lasers 21 to generate a green triangle 24 as shown in FIG. 2 (or any other useful pattern) on the correctly placed ply 5. This gives the workers immediate feedback that the job is complete and that they can start with the next ply, for example. The lasers 21 will then proceed to generate markings 22 that will indicate the correct position of the next ply.

On the other hand, if the edges 14 of the ply 5 that has been placed do not correspond to the target positions from the CAD model, then the lasers 21 will show a red cross on ply 5. Also, the control device 23 will control the lasers 21 not to show the markings 14 for the next ply to be placed until the position of the ply 5 has been corrected.

Also, when for some reason the ply 4 that has already been placed should move—for example with its edges 14'—out of its correct position, this ply will be marked accordingly. For example, the control device 23 will control the lasers 21 to show the edge markings 22' for this ply. This function is obtained through the control device 23 controlling the cameras 9 to continuously capture all features of the entire mold surface 2 as well as of all plies 4-7 (also termed plies "$1^{st}$ to $k^{th}$" herein) and other materials on the mold surface 2 that have been placed until then.

Advantageously, since the computing device 15 uses edge computing the guidance or feedback to the user can be given in real time. Latency from the point in time when, for example, the position of a ply 4-7 changes until the guidance or feedback is produced by the lasers 21 is less than 2 or 3 seconds.

Another feature of the production system 1 is that the computing device 15 will also recognize any foreign objects such as the scissors 12 in FIG. 1 that have accidently been left on the mold surface 2. The control device 23 will then control the lasers 21 to, for example, circle the foreign object with a red line of light (illustrated in FIG. 1 with a circle around the scissors 12). This will avoid any foreign objects to become integrated into the finished blade, removal of which being expensive and detrimental to structural integrity of the blade. Similarly, the computing device 15 may be configured to spot defects as they occur in the plies 4-7 and other materials used to build the blade on the mold 2. When such a defect is spotted, the control device 23 will control the lasers 21 to circle or otherwise highlight the defect.

Put more generally, the production system 1 is capable of spotting new 'anomalies' for categorization as accepted or not, thereby allowing for continuous learning. When the production system 1 registers something for the first time that looks abnormal, this is flagged to the production staff and forwarded to the quality department who can then allow this to be passed as acceptable or teach the system 1 that this should from now on be flagged as an error to be fixed.

As shown at the far end of FIG. 1, there is a second team of workers laying the ply 7 simultaneous with the workers of the first team laying the ply 5. Therein, markings (not shown) are also generated for the ply 7 (also termed "$j^{th}$ plie" herein) to guide the lay-up process. Thus, two or more teams can work in parallel in the production system 1 to build the blade in shorter time.

Also, the captured features (e.g. edges 14) are stored in the data storage device 19 (see FIG. 3). Based on the color, texture etc., the computing device 15 may also be configured to recognize the material of which the blade is made of. Thus, a digital twin of the blade produced may be generated and saved. This data can be accessed when, for example during the lifetime of the blade (e.g. in operation), problems occur and knowledge of the exact position of plies and other materials is needed.

Figure 4:
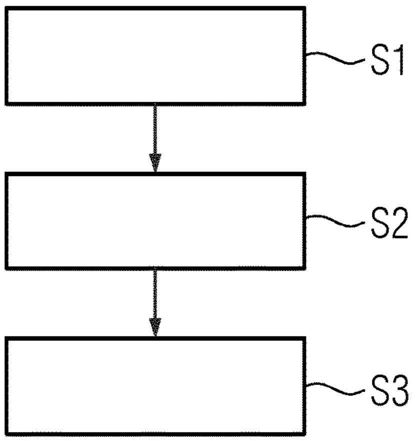
FIG. 4 shows a flow chart of a method according to an embodiment.

FIG. 4 illustrates an embodiment of a method for producing composite fiber components, in particular wind turbine blades.

In step S1, features of the mold surface 3 (see FIG. 1) and of plies 4-7 laid on the mold surface 3 are optically captured.

In step S2, a position of the captured features 12, 13, 14 and a comparative result depending on a comparison of the determined position (measured 3D coordinates) and a reference position (3D coordinates from CAD model or at least derived therefrom) is determined.

In step S3, feedback 24 (or guidance such as the markings 14 in FIG. 1) is given to the workers depending on the comparative result in real time.

Although the present invention has been disclosed in the form of embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements.

The invention claimed is:

1. A production system for producing a composite fiber component comprising:

a working surface;

an optical device for optically capturing features of the working surface and/or of plies laid on the working surface, the plies comprising fiber material;

a computing device for determining a parameter of the captured features and a comparative result depending on a comparison of the determined parameter and a reference parameter;

a feedback device configured to give feedback depending on the comparative result;

a projector device for projecting a pattern of light on the working surface and/or on an upwardly exposed surface of a ply to guide placement of plies on the working surface and/or on the ply; and a control device, the control device being configured for controlling:

the projector device to project a $k^{th}$ pattern corresponding to a target position of a $k^{th}$ ply, and, at the same time, to project a $j^{th}$ pattern corresponding to a target position of a $j^{th}$ ply;

the optical device for optically capturing features of the $k^{th}$ ply and the $j^{th}$ ply laid on the working surface;

the computing device for determining a position of the captured features and a comparative result depending on a comparison of the determined position and a reference position for the $k^{th}$ ply and the $j^{th}$ ply respectively; and the feedback device to give feedback depending on the respective comparative result;

wherein k is incremented from 1 to N, with N designating the total number of plies making up a first portion of the composite component to be produced, and j is incremented from 1 to M, with M designating the total number of plies making up a second portion of the composite component to be produced, wherein the computing device determines presence of a foreign object, wherein the foreign object is a tool, wherein the parameter includes a position and/or geometry of the tool, wherein the projector device comprises at least one laser, wherein the control device controls the at least one laser to locate and indicate the position and/or geometry of the tool on the working surface by circling the tool with a red line light about the tool on the working surface.

2. The system according to claim 1, the optical device comprising a plurality of optical cameras and/or lidar sensors.

3. The system according to claim 1, including a mold and the working surface being a mold surface, and/or the optical device capturing features within a volume above and/or including the mold surface.

4. The system according to claim 1, the captured features comprising edges, material and/or defects of the plies, and/or reference points on the working surface, and/or the parameter including color and/or texture.

5. The system according to claim 1, the feedback including a visual and/or acoustic feedback.

6. The system according to claim 5, the visual feedback including a pattern of light projected on the working surface and/or on an upwardly exposed surface of a ply.

7. The system according to claim 1, wherein the composite fiber component is a wind turbine blade.

8. The system according to claim 1, the pattern demarcating a target position of a ply to be placed on the working surface and/or on the upwardly exposed ply.

9. The system according to claim 1, the control device being configured for controlling:

the projector device to project a first pattern corresponding to a target position of a first ply and a second pattern corresponding to a target position of a second ply;

the optical device to optically capture features of the first ply laid on the working surface; and the computing device to determine a position of the captured features of the first ply and a comparative result depending on a comparison of the determined position and a reference position;

wherein the projection of the second pattern depends on the comparative result.

10. The system according to claim 1, the control device being configured for controlling:

the optical device to capture the features of the working surface and/or $1^{st}$ to $k^{th}$ ply laid on the working surface.

11. The system according to claim 1, wherein the captured features include reference points on the working surface and any foreign objects present on the working surface.

12. The system according to claim 1, further comprising a storage device for storing the captured features and/or wherein the computing device uses a machine learning algorithm and/or uses edge computing.

13. The system according to claim 1, wherein the control device is further configured to evaluate contextual data related to workers in a vicinity of the foreign object.

14. A method for producing a composite fiber component comprising the steps of:

optically capturing, via an optical device, features of a working surface and/or of plies laid on the working surface, the plies comprising fiber material;

determining, via a computing device, a parameter of the captured features and a comparative result depending on a comparison of the determined parameter and a reference parameter;

giving feedback, via a feedback device, depending on the comparative result;

providing a projector device for projecting a pattern of light on the working surface and/or on an upwardly exposed surface of a ply to guide placement of plies on the working surface and/or on the ply; and providing a control device, wherein the control device being configured for controlling the optical device, the computing device, the feedback device and the projector device;

projecting, via the projector device, a $k^{th}$ pattern corresponding to a target position of a $k^{th}$ ply, and, at the same time, to project a $j^{th}$ pattern corresponding to a target position of a $j^{th}$ ply;

capturing features, via the optical device, of the $k^{th}$ ply and the $j^{th}$ ply laid on the working surface;

determining, via the computing device, a position of the captured features and a comparative result depending on a comparison of the determined position and a reference position for the $k^{th}$ ply and the $j^{th}$ ply respectively; and giving feedback, via the feedback device, depending on the respective comparative result;

incrementing k from 1 to N, with N designating the total number of plies making up a first portion of the composite component to be produced, and incrementing j from 1 to M, with M designating the total number of plies making up a second portion of the composite component to be produced, wherein the computing device is configured to determine presence of a foreign object, wherein the foreign object is a tool, wherein the parameter includes a position and/or geometry of the tool, wherein the projector device comprises at least one laser, wherein the control device is configured to control the at least one laser to locate and indicate the position and/or geometry of the tool on the working surface by circling the tool with a red line light about the tool on the working surface.

* * * * *